(12) United States Patent
Elbe et al.

(10) Patent No.: US 6,970,016 B2
(45) Date of Patent: Nov. 29, 2005

(54) DATA PROCESSING CIRCUIT AND METHOD FOR TRANSMITTING DATA

(75) Inventors: Astrid Elbe, Munich (DE); Norbert Janssen, Munich (DE); Holger Sedlak, Sauerlach (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 11/004,658

(22) Filed: Dec. 3, 2004

(65) Prior Publication Data

US 2005/0116740 A1    Jun. 2, 2005

Related U.S. Application Data

(63) Continuation of application No. PCT/EP03/05641, filed on May 28, 2003.

(30) Foreign Application Priority Data

Jun. 4, 2002    (DE) ................. 102 24 742

(51) Int. Cl.[7] ..................... H03K 19/0175; G11C 2/00
(52) U.S. Cl. ..................... 326/86; 326/90; 365/189.01; 365/190; 365/191
(58) Field of Search ..................... 326/86, 90, 30, 326/93, 95, 98; 327/112, 218, 211; 365/189.01, 365/190, 191, 220, 221

(56) References Cited

U.S. PATENT DOCUMENTS

| | | | |
|---|---|---|---|
| 4,870,681 A | 9/1989 | Sedlak | |
| 5,500,820 A * | 3/1996 | Nakaoka | 365/189.01 |
| 5,608,883 A | 3/1997 | Kando et al. | |
| 6,166,989 A * | 12/2000 | Hamamoto et al. | 365/233 |
| 6,236,240 B1 | 5/2001 | Hill | |
| 6,265,923 B1 * | 7/2001 | Amir et al. | 327/218 |
| 6,819,139 B2 * | 11/2004 | Kim | 326/82 |

FOREIGN PATENT DOCUMENTS

| | | |
|---|---|---|
| DE | 3631992 A1 | 11/1987 |
| EP | 0715262 A1 | 6/1996 |
| EP | 0788059 A1 | 8/1997 |
| EP | 1197872 A2 | 4/2002 |

OTHER PUBLICATIONS

A Low Power Zero-Overheated Self-Timed Division and Sqyare Root Unit Combining A Single-Rail Static with a Dual-Rail Dynamic Circuit, Gensoh Matsubara and Nobuhiro Ide, p.p. 198-209, 1997—no month.

* cited by examiner

Primary Examiner—Vibol Tan
(74) Attorney, Agent, or Firm—Darby & Darby

(57) ABSTRACT

Data processing circuit including a single rail bus having a single rail line, a dual rail bus having a first dual rail line for data bits and a second dual rail line for inverted data bits, and a converter for converting signals on the single rail bus into signals on the dual rail bus and vice versa. The converter has a read driver for transferring signals on the first dual rail line to the single rail bus when the read driver is active, a write driver for transferring the signals on the single rail bus to the first dual rail line when the write driver is active, a producer for producing the signals on the second dual rail line from the signals on the first dual rail line when the write driver is active, and a controller for controlling the drivers so that at most only one driver is active.

19 Claims, 4 Drawing Sheets

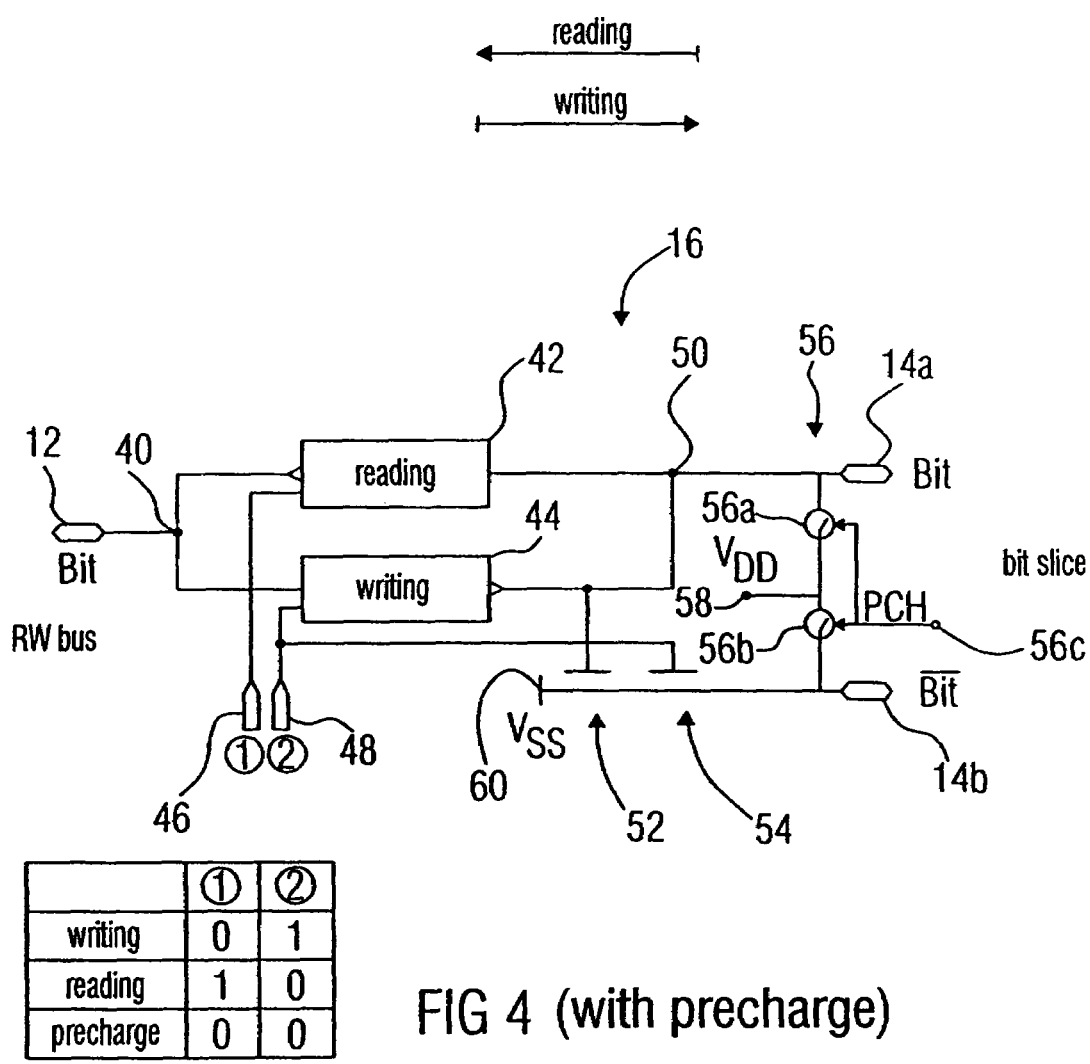
FIG 4 (with precharge)

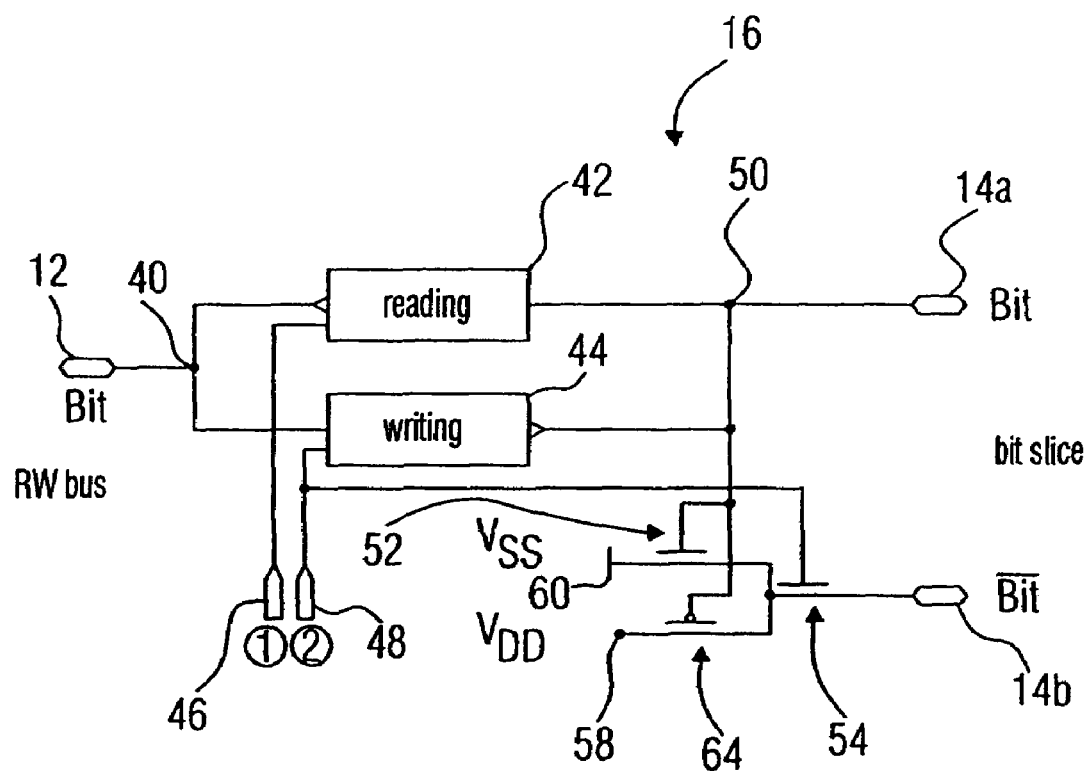
FIG 5 (without precharge)

DATA PROCESSING CIRCUIT AND METHOD FOR TRANSMITTING DATA

CROSS-REFERENCE TO RELATED APPLICATION

This application is a continuation of copending International Application No. PCT/EP03/05641, filed May 28, 2003, which designated the United States and was not published in English, and is incorporated herein by reference in its entirety.

BACKGROUND OF THE INVENTION

1. Field of the Invention

The present invention relates to processor architectures and, in particular, to a data processing circuit and to a method of transferring data, in which the safety against external attacks for spying out data is increased.

2. Description of Related Art

Cryptographic algorithms are generally characterized by the fact that safety-relevant data is processed. Such safety-relevant data is, for example, a private key in an asymmetric cryptography algorithm, such as, for example, the RSA algorithm. The private key is used to decrypt data having been encrypted by a corresponding public key. Alternatively, the private key is used to process a digital signature by the pertaining public key for purposes of authentification.

Such processors, however, do not only process data using private or secret keys but typically also include data relating to persons which has to be protected from attacks, such as, for example, personal data or the balance when a payment card is considered. The PIN of an ec payment card of course also belongs to such secret data which is absolutely to be protected from external attacks to obtain an acceptance of such a cryptographic system in the market.

A special field in which cryptographic algorithms are increasingly employed are chip cards or safety ICs. In particular in chip cards, another requirement is that the space for a chip card processor system is limited. The chip area available, which is usually predetermined, must be utilized to the best degree possible to accommodate a calculating unit and a working memory and a non-volatile memory on the one hand and to accommodate the periphery elements belonging to a cryptography process system, such as, for example, a crypto-coprocessor, a random number generator, an input/output port etc., on the other hand.

Well-known attacks to cryptographic systems are the so-called power analysis attacks. Since cryptography processors are typically realized in CMOS technology, such circuits have a strongly inhomogeneous power consumption when no special counter-measures are taken. As it is well known, CMOS circuits hardly consume any power at all when states on a bus or in a calculating unit do not change. If, however, the states in a calculating unit or on a bus change, a current which has to be fed in by a power source will flow during switching a CMOS circuit from one state to another state. This is in particular true for bus driver circuits which, in particular when the data buses are long, apart from the actual power consumption the CMOS circuit has, also have to provide a current for reloading power capacities which in such long buses can take up considerable values.

In addition, long number calculating units are employed for cryptography processor for reasons of safety on the one hand and for performance reasons on the other hand. Such long number calculating units sometimes comprise a data width of, for example, more than 1024 or—in recent times—more than 2048 bits. Such a long number calculating unit includes a corresponding number of bit slices, wherein a bit slice, apart from the actual arithmetic unit usually including at least one full adder function, also has register cells for several registers required for executing a cryptographic operation, such as, for example, a modular multiplication.

In DE 3631992 C1, a long number calculating unit including, as a central element, a long number 3 operands adder for executing a modular exponentiation required for the RSA algorithm is disclosed. The modular exponentiation is divided into a plurality of modular multiplications which, in turn, are divided into a plurality of 3-operands additions. Using a multiplication look ahead algorithm and a reduction look ahead algorithm coupled thereto, a 3-operands operation results in which an intermediate result, the multiplicand and the modulus, possible multiplied by shift values and look ahead parameters, are added to yield a new intermediate result.

Within a bit slice, there is a so-called slice internal bus connecting the register positions within the bit slice and the slice calculating unit to one another. The bit slices of the calculating unit are connected to one another via a calculating unit internal bus which usually only has a data width of for example eight bits and to the other elements of the cryptography data processing system for example via an external bus.

Considering the fact that a long number calculating unit comprises very many bit slices, this calculating unit internal bus running outside the bits slices is a very long data bus having a length of several millimeters and which can be recognized on the integrated circuit as a very regular structure. The same applies to the long number calculating unit itself comprising one or several stacks of bit slices.

Considering the fact that in typical safety ICs the chip area itself is limited and, in addition, the power consumption also plays a role which is particularly considerable when contactless applications are considered, in which the chip card itself has no power supply of its own but gets its power from the surrounding HF field, requirements that chip area is saved and the power consumption is to be kept low result for the calculating unit internal bus on the one hand and the bit slices on the other hand.

On the other hand, in safety ICs there are requirements that measures against external attacks, such as, for example, power attacks, of which the simple power attacks (SPA) or the differential power attacks (DPA) are the best known members, must be taken. Without such measures, an attacker could trace each switching process on, for example, the calculating unit bus or a slice internal bus by a power analysis and then would only have to find out the original state or intermediate data state in order to be able to record all the data processed in order to be able to determine secret data, such as, for example, secret keys, PINs, balance amounts etc. knowing the algorithm executed and other marginal conditions.

A method optimal regarding the safety is to no longer form each data bus—relating to a bit line—as a single data line but as two data lines. This so-called dual rail technology is based on the fact that at a certain time complementary states are transmitted on the two data lines. If, on a first dual rail line, there is a voltage state, for a certain time, representing a logic "1", the complementary state is present on the second dual rail line, that is, with this example, a voltage state corresponding to a logic "0". Thus, the safety is already increased in that at each switching from one state to another, both lines switch so that it can no longer be found out by a power analysis in which direction a switch has been performed since the two switching directions always take place simultaneously.

Although a safety increase has already been obtained, it can nevertheless be recognized by means of the power analysis whether switches have been performed in subsequent cycles or not. If there are, for example, five subsequent logic "1" states, no power consumption can be recognized in the power characteristic so that an attacker can still obtain the information that nothing has changed in the data on the dual rail bus in these five cycles.

In order to eliminate this safety leak as well, the so-called dual rail technology with precharge is used. A so-called precharge clock is fed in between each data clock. In this precharge clock, both the first dual rail line and the second dual rail line are brought to a logically high state so that a single switching will always be recognizable in the current profile, that is when it is proceeded from a data clock to a precharge clock, or when it is proceeded from a precharge clock to a data clock, and irrespective of whether the data change from one clock to the next.

Although the dual rail technology with precharge has provided a maximum safety, this is, however, paid for by a maximum expenditure. Because each bit line has to be formed twice, the dual rail technology leads to double the chip area consumption for the transmission buses. Since, additionally, a precharge clock is introduced after each data clock, this technology also leads to a processing speed half as large since no payload data can be processed in the precharge clocks.

Since, in addition, two data lines must be reloaded and thus two line drivers—instead of one line driver in single rail—exist, the power consumption is twice as large. The maximum safety thus has a high price, that is a chip area consumption twice as large, a payload data throughput half as large and double a power consumption.

For these reasons, the dual rail technology with precharge, in spite of the superior safety provided against power attacks, is usually not employed in safety ICs.

Typically, alternative solutions are employed, such as, for example, dummy calculations for disguising the power profile, software technological algorithms which—irrespective of the data processed—require the same number of cycles, etc. It is common to all those measures that they do not provide a maximum safety against more complex attack algorithms and require intervention in routines already existing, resulting in the fact that extended tests etc. must be performed for the routines, respectively, so that on the one hand the cost increases and on the other hand the time in which a new product can be launched on the market increases. Additionally to certain safety requirements, those two topics are decisive for whether a cryptography processor chip can gain acceptance on the very competitive market or not.

SUMMARY OF THE INVENTION

It is an object of the present invention to provide a concept for a safe but nevertheless economical data processing.

In accordance with a first aspect, the present invention provides a data processing circuit having: a single rail bus having a single rail line for a sequence of data bits; a dual rail bus having two dual rail lines for the sequence of data bits, a first dual rail line being provided for the data bits and a second dual rail line being provided for inverted data bits; and converting means for converting signals on the single rail bus into signals on the dual rail bus and vice versa, the converting means having: a read driver for converting or transferring signals on the first dual rail line to the single rail bus and for ignoring signals on the second dual rail line when the read driver is active; a write driver for converting or transferring the signals on the single rail bus to the first dual rail line when the write driver is active; producing means for producing the signals on the second dual rail line from the signals on the first dual rail line when the write driver is active; and controlling means for controlling the read driver and the write driver via a read control signal and a write control signal so that at most either the read driver or the write driver is active.

In accordance with a second aspect, the present invention provides a method of transferring data from a single rail bus having a single rail line to a dual rail bus having two dual rail lines, wherein a first dual rail line is provided for a sequence of data bits and a second dual rail line is provided for a sequence of inverted data bits, having the following steps: converting signals on the single rail bus into signals on the dual rail bus and vice versa, the step of converting having the following steps: activating a read driver and converting signals on the first dual rail line to the single rail bus and for ignoring signals on the second dual rail line when the read driver is activated; activating a write driver and converting the signals on the single rail bus to the first dual rail line when the write driver is activated, and generating the signals on the second dual rail line from the signals on the first dual rail line when the write driver is active; and wherein the step of activating the read driver and the step of activating the write driver are executed so that at most either the read driver or the write driver is active.

The present invention is based on the finding that, for reasons of safety, certain parts of a safety ICs are formed in dual rail technology with or without precharge and predischarge, respectively, while other areas in which no safety relevant data of this kind is processed are still to be formed in single rail technology. According to the invention, converting means is placed at the interface between the single rail bus and the dual rail bus to convert signals on the single rail bus into signals on the dual rail bus or vice versa.

The inventive combination of a single rail bus and a dual rail bus due to the converting means therebetween makes it possible to use both bus types in a safety IC to obtain an optimum trade-off between safety on the one hand and economy on the other hand.

In a preferred embodiment of the present invention, the slice internal buses are formed in dual rail technology with or without precharge/discharge, while the calculating unit internal bus considerable in its length and thus in its area consumption, which is external of the slices and connects the slices to one another, is still formed in single rail technology so that one converting means is further associated to each bit slice. Alternatively, converting means can also be provided at the input of the multiplexer for connecting the calculating unit bus which usually has a small band width, such as, for example, only eight bits, to the calculating unit slices which can, for example, amount to more than 2048. In this case, the entire multiplexer would be formed in dual rail technology. In the other embodiment in which converting means is located directly at the input of the bits slices, the multiplexer has to be formed in single rail technology only since a conversion only takes place at the output of the multiplexer.

The inventive concept is of advantage in that the, as far as safety is concerned, optimum dual rail technology with precharge can also be employed in a safety IC which has to meet strict chip area requirements and strict power consumption requirements. According to the invention, the safety advantages of dual rail technology with precharge are thus combined with the area and power advantages of the single rail solution by employing a conversion of dual rail to single rail and vice versa within a safety IC at one location or any locations. This solution has hardly any disadvantages regarding the safety of the system when the constantly changing data is on the dual rail side while the single rail side is used for more rare processes, such as, for example, reading and writing non-changing data, such as, for example, initialization values, final result, etc. This is preferably obtained by forming the slice internal buses as dual rail buses, while all the other buses in the inventive data processing circuit are to be formed in single rail technology in order to save area and current, without having to put up with considerable safety disadvantages since the, as far as safety is concerned, highly relevant slice internal buses are formed in the safe dual rail technology with precharge.

BRIEF DESCRIPTION OF THE DRAWINGS

Preferred embodiments of the present invention will be detailed subsequently referring to the appended drawings, in which:

FIG. 4 shows converting means according to a preferred embodiment for dual rail with precharge; and FIG. 5 shows converting means according to an alternative embodiment in dual rail technology without precharge.

DESCRIPTION OF THE PREFERRED EMBODIMENTS

Figure 1:
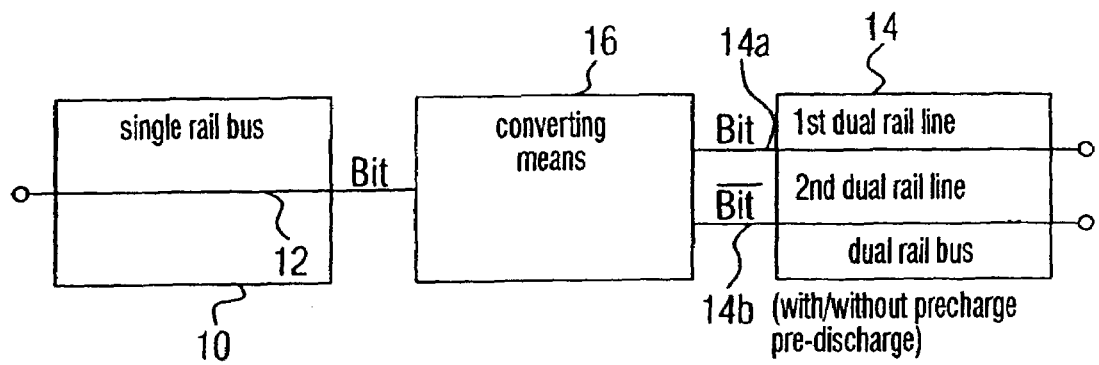
FIG. 1 is a principle block diagram of an inventive data processing circuit.

FIG. 1 shows an inventive data processing circuit having a single rail bus 10, wherein the single rail bus has a single rail line 12 which, in FIG. 1, is also referred to as a bit line, for a sequence of data bits.

The inventive data processing circuit further includes a dual rail bus having two dual rail lines 14a, 14b for the sequence of data bits, wherein a first dual rail line 14a is provided for a sequence of data bits and a second dual rail line 14b is provided for a sequence of inverted data bits.

The inventive data processing circuit further includes converting means 16 for converting signals on the single rail bus 12 into signals on the dual rail bus 14 and vice versa.

Figure 2:
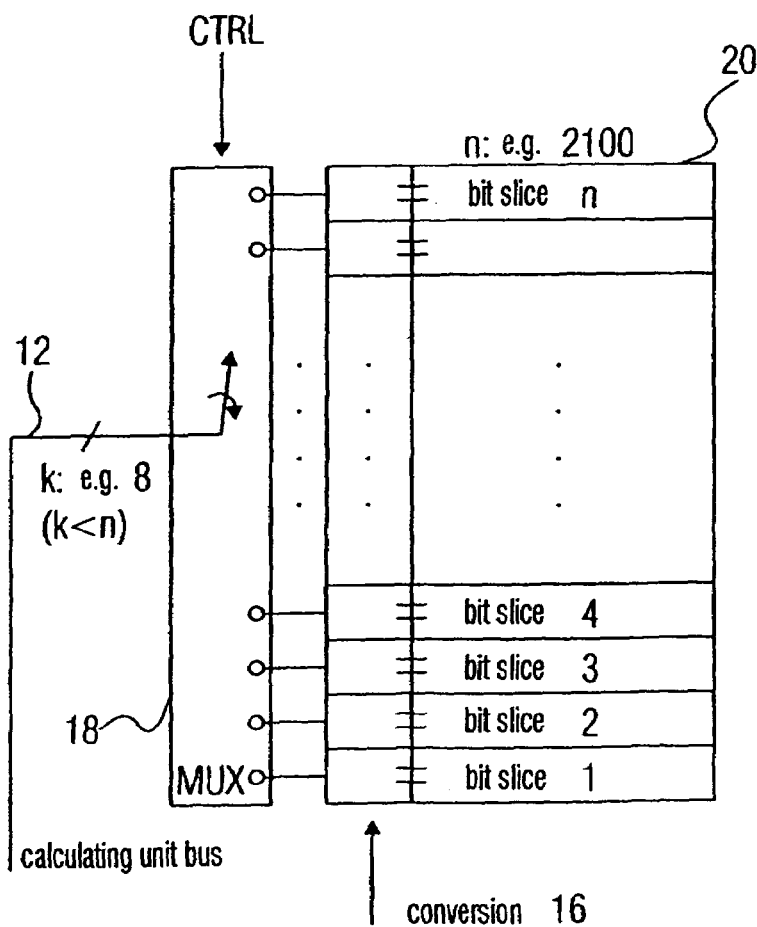
FIG. 2 shows a preferred embodiment of the present invention with the example of a long number calculating unit having a calculating unit internal bus in single rail and a bit slice internal bus in dual rail.

FIG. 2 shows a data processing circuit according to a preferred embodiment of the present invention, including a calculating unit bus as a single rail bus 12. For reasons of simplicity, the calculating unit bus 12 in FIG. 2 is only shown as a single line, wherein the calculating unit bus 12 actually is a parallel bus and includes k data lines, k, for example, equaling 8 or 16.

The calculating unit bus 12 is connected via a multiplexer 18 to converting means 16 which, in turn, is connected to dual rail buses for each bit slice 1, ..., n of a long number calculating unit 20. The long number calculating unit includes a number of n bit slices which is larger than 2048 and, for example, includes 2100 or even 2300 bit slices. According to the invention, the slice internal buses are formed as dual rail buses, while the calculating unit bus connecting the individual slices among one another and the individual slices to other components of the safety IC, respectively, is formed in single rail technology. In the embodiment of the present invention shown in FIG. 2, an individual single rail/dual rail converting means 16 is associated to each bit slice such that the multiplexer 18 is formed in single rail technology. In an alternative embodiment, however, even the multiplexer input which, in the embodiment shown in FIG. 2, has a width of eight bits, could already be provided with converting means for each bit line, wherein the multiplexer would have to be formed in dual rail technology completely in this case. This solution might be more favorable since considerably fewer converting means are required, that is only eight instead of 2100 converting means in the example shown in FIG. 2.

Figure 3:
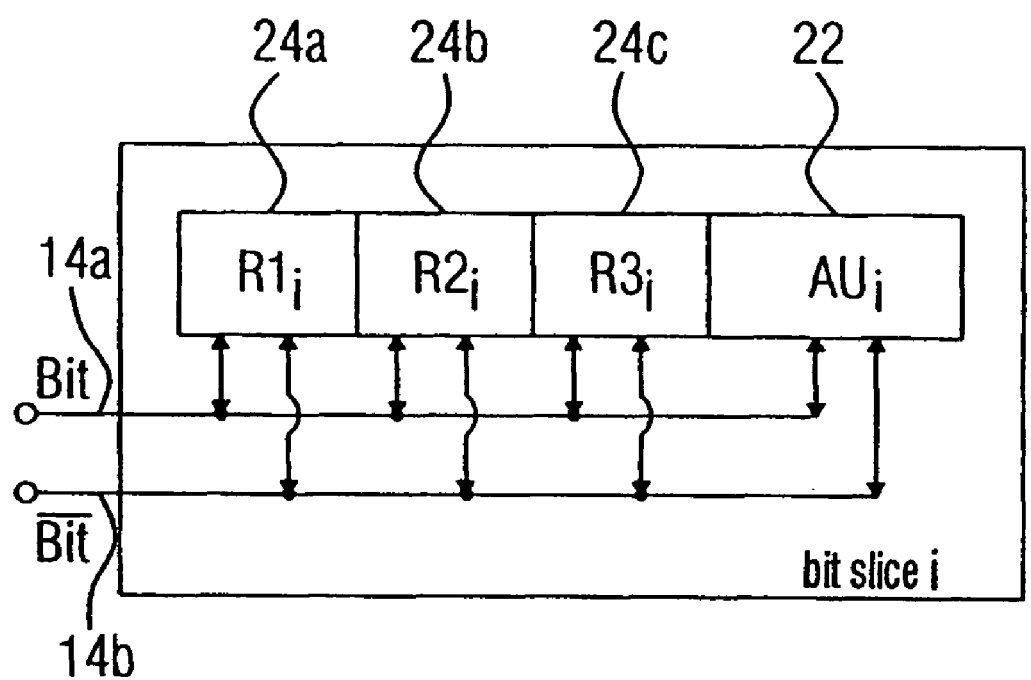
FIG. 3 is a detailed illustration of a bit slice in dual rail technology.

FIG. 3 shows a schematic illustration of a bit slice i. Each bit slice includes an arithmetic unit $AU_i$, referred to by the reference numeral 22 in FIG. 3, and one or several register locations $R1_i$, $R2_i$, $R3_i$, wherein the register locations are referred to by 24a, 24b, 24c. Each register bit is connected among each other and to the arithmetic unit 22 in the bit slice via a dual rail bus which comprises the first dual rail line 14a and the second dual rail line 14b for the inverted bits (BIT). The set-up of each bit slice i in dual rail technology ensures that the data communicated between the registers 24a, 24b, 24c and the arithmetic unit 22 cannot be attacked by a power analysis. This data typically is sensitive data and is, according to the invention, protected strongly.

The data transported on the calculating unit bus 12, however, usually is not safety-sensitive data so that the set-up of the calculating unit bus 12 in single rail technology does not result in particularly large safety disadvantages but in considerable savings in chip area, power consumption and processing time.

Referring to FIG. 4, a preferred embodiment of converting means 16 will be detailed subsequently, which is suitable for a dual rail technology with precharge. Referring to FIG. 5, converting means 16 which is provided for a dual rail technology without precharge will be detailed.

The converting means 16 in FIG. 4 is, at its input, connected to the bit line 12 of the single rail bus. On the output side, it is connected to the first dual rail line 14a for data bits and to the second dual rail line for inverted data bits (14b).

The single rail line 12 is connected to a first node 40 which is connected to an output of a read driver 42 on the one hand and to an input of a write driver 44 on the other hand. A read driver control signal is fed to the read driver 42 as an input signal 46. A write driver control signal 48 is fed into the write driver 44. Another input of the read driver circuit 42 is connected to the first dual rail line 14a.

The first dual rail line 14a is connected to an output of the write driver 44 via a node 50 and also represents a control signal for a first switch 52. A second switch 54 is further provided to be controlled by the write control signal 48, as can be seen in FIG. 4.

The converting means shown in FIG. 4 further includes precharge means 56 having two switches 56a, 56b and a precharge clock input PCH 56c. Both switches are controlled by the precharge control signal 56c and are effective to place the potential $V_{DD}$ 58 which, in a preferred embodiment of the present invention, corresponds to a logically high state, that is a state of a logic "1", at both the first dual rail line 14a and the second dual rail line 14b.

A second low potential $V_{SS}$ 60 is applied to the second dual rail line 14b when both the first switch 52 and the second switch 54 are connected through. If, however, one of the switches 52, 54 does not connect through, there is no conductive connection between the potential $V_{SS}$ 60 and the second dual rail line 14b. The second low potential $V_{SS}$ can be the ground potential and in the embodiment described corresponds to the logically low state or the logic "0" state.

In FIG. 5, same elements as in FIG. 4 have the same reference numerals. FIG. 5 does not include the precharge means 56 since FIG. 5 is provided for a dual rail technology without precharge. As an additional element, FIG. 5 includes a third switch 64 which, as can be seen from the symbol in FIG. 5, in contrast to the other switches occurring, is formed as a PMOS transistor, while the switches 52, 54 are formed as NMOS transistors. NMOS transistors are connected through when the control signal has a high voltage state and block when the control signal has a low state. PMOS transistors in contrast are connected through when the control signal has a low state. The PMOS transistors do, however, block when the control signal has a high voltage state.

In the following, the function of the inventive converting means will be illustrated referring to FIG. 4. In the case of reading from the bit slice to the calculating unit bus, the read control signal 46 is active so that the signal on the first dual rail line 14a—irrespective of whether it is a "1" or "0"—is connected through to the single rail line 12. It is to be pointed out that the read driver circuit 42, as well as the write driver circuit 44, could, for example, also be formed as an AND gate which only produces an output signal when both input signals have a "1" state. The circuit shown in FIG. 4 has the effect that the signal on the second dual rail line 14b is ignored in the case of reading from the bit slice to the calculating unit bus, that is in the case of a data transmission from the right-hand side to the left-hand side in FIG. 4.

The write control signal, in the case of reading, is 0, which means that the second switch 54 of FIG. 4 is open, that is blocking, so that the second dual rail line 14b is not connected to the ground potential 60. This ensures that in a subsequent precharge clock in which both switches 56a, 56b are closed to bring both dual rail lines to a logically high state, a voltage can be applied without producing a short circuit with the ground potential 60.

In the case of the precharge clock, the read control signal 46 equals 0 so that the precharge stage on the second dual rail line 14a is prevented from being transmitted to the single rail line 12.

The circuit shown in FIG. 4 thus ensures that, in the case of reading, that is in the case of converting from dual rail with precharge to single rail—only in the data clock and not in the precharged clock—the state on the first dual rail line 14a is connected through to the single rail line 12 so that no data transmission from the first dual rail line to the single rail line takes place in the precharge clock and the second dual rail line 14b is also separated from the ground potential 60 ($V_{SS}$) so that the second dual rail line as well as the first dual rail line can be charged to a high state in the precharged clock.

The conversion of a single rail signal into a dual rail signal, that is the data transmission from the left-hand side to the right-hand side in FIG. 4, which is also referred to as "writing", will be described subsequently.

In the case of writing, as can be seen from the table shown in FIG. 4, the read driver 42 is disabled by a "0" at the control signal input. In contrast, the write driver 44 is activated by a "1" at its control input. This leads to the fact that the signal present on the bit line is directly connected through to the first dual rail line 14a in a data clock. If, at the output of the write driver 44, there is a logically high state, that is a "1", the switch 52 is closed. Due to the fact that the write control signal equals "1", the switch 54 is also closed so that the ground potential $V_{SS}$ 60 is connected to the second dual rail line 14b so that the inverted state, that is a "0", is produced on the second dual rail line.

If there is, however, a 0 at the output of the write driver 44, this 0 is also present on the first dual rail line 14a. Due to the 0, however, the first switch 52 is open so that the ground potential 60 is not connected to the second dual rail line 14b but is separated from it. The "1" state present on the previous precharged clock on the second dual rail line 14b thus remains which has the result that the complementary value to the first dual rail line is again present on the second dual rail line 14b.

The inventive converting means of FIG. 4 thus ensures that, in the case of a conversion from single rail in dual rail, the single rail state is placed to the first dual rail line 14a on the one hand, that, in the case of a precharge clock, nothing is transmitted from the input to the output and that, in the case of a single rail "1" state, the second dual rail line is short-circuited to the ground potential or, in the case of a single rail "0" state, the high state of the second dual rail line is maintained due to the previous precharge clock.

The function of the converting means of FIG. 5 will be detailed subsequently, illustrating converting means for single rail to dual rail without precharge. For this reason, no precharge means 56 is provided in FIG. 5. Instead, the third switch 64 is used, by which the high potential $V_{DD}$ 58 can be placed at the second dual rail line when the write control signal 48 is high, that is the second switch 54 is closed and the first switch 52 is open (a "0" at the output of the write driver 44). This is obtained by the fact that the third switch 64 is formed as a PMOS transistor so that the potential $V_{DD}$ is connected to the second dual rail line 14b when a "0" is present at the output of the write driver 44.

If, in the embodiment shown in FIG. 5, a "1" is fed at the single rail bus in the next operating cycle, it is again simply connected through to the first dual rail line 14a. Now the third switch 64 is, however, open and the first and second switches 52, 54 are closed so that the high state from the previous cycle on the second dual rail line is discharged via the ground potential 60 ($V_{SS}$) to pull the second dual rail line 14b to the low potential state. Although the embodiment shown in FIG. 4 has been described for dual rail with precharge, the modifications for dual rail with pre-discharge are easily apparent to those skilled in the art. Instead of the potential $V_{DD}$ 58 of FIG. 4, the potential $V_{SS}$ could be employed. Instead of the potential $V_{SS}$ 60, potential $V_{DD}$ could be taken, wherein the switches 52 and 54 are to be modified such that the logically low state from the previous precharge cycle is maintained in the case of a "1" on the single rail line 12.

Alternative designs for the read driver 42 and the write driver 44 are also apparent to those skilled in the art as long as the functions of reading and writing are ensured and both drivers are blocked during the precharge clock so that no data transmission takes place from one end to the other end of the circuit.

In the embodiment shown in FIG. 4, in which a dual rail technology with precharge is employed, the data rate at the dual rail output, due to the precharge clock, is half as big as at the single rail input with the same operating cycle on both sides. This data rate difference can be utilized to half the data rate also on the single rail bus to obtain safety improvements. This can be performed by performing an encryption or coding of the data on the single rail bus. In this case, converting means would, on the input side, comprise a memory for storing two subsequent bits and decrypting means or decoding means in order to obtain the unencrypted or decoded single rail bus bit which is then converted into an unencrypted dual rail bit. For increasing the safety standard even on the single rail bus, thus a data coding or data encryption resulting in half the payload data rate can be employed. In this case, the single rail bus and the dual rail bus are, again, in synchronism but with different measures for increasing the safety.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A data processing circuit comprising:
    a single rail bus having a single rail line for a sequence of data bits;
    a dual rail bus having two dual rail lines for the sequence of data bits, a first dual rail line being provided for the data bits and a second dual rail line being provided for inverted data bits; and
    a converter for converting signals on the single rail bus into signals on the dual rail bus and vice versa, the converter comprising:
        a read driver for transferring signals on the first dual rail line to the single rail bus and for ignoring signals on the second dual rail line when the read driver is active;
        a write driver for transferring the signals on the single rail bus to the first dual rail line when the write driver is active;
        a producer for producing the signals on the second dual rail line from the signals on the first dual rail line when the write driver is active; and
        a controller for controlling the read driver and the write driver via a read control signal and a write control signal so that at most either the read driver or the write driver is active.

2. The data processing circuit according to claim 1, wherein the controller is further configured to disable both the read driver and the write driver during an initialization clock so that no data transmission takes place from the dual rail bus to the single rail bus during the initialization clock.

3. The data processing circuit according to claim 1, wherein the write driver has an AND function, wherein a first input of the write driver is connected to the single rail line, a second input of the write driver is connected to the write control signal and an output of the write driver is connected to the first dual rail line.

4. The data processing circuit according to claim 1, wherein the read driver has an AND function, wherein a first input of the read driver is connected to the first dual rail line, a second input of the read driver is connected to the read control signal and an output of the read driver is connected to the single rail line.

5. The data processing circuit according to claim 3, wherein the converter further comprises:
    a unit for applying a first potential associated with a low voltage stage; and
    a first switch connected between the second dual rail line and the unit for applying the first potential, the first switch being controllable by the write control signal.

6. The data processing circuit according to claim 5, wherein the converter further comprises:
    a second switch connected between the second dual rail line and the unit for applying the first potential, the second switch being controllable by an output signal of the write driver.

7. The data processing circuit according to claim 1, wherein the dual rail bus is a dual rail bus with precharge or pre-discharge so that between each data clock on the first and second dual rail lines an initialization clock in which the first dual rail line and the second dual rail line are brought to the same voltage state is inserted.

8. The data processing circuit according to claim 7, wherein the two dual rail lines are connected to an initializer, wherein the initializer is effective to bring the two dual rail lines to the same voltage state during the initialization clock.

9. The data processing circuit according to claim 8, wherein the voltage state is a high voltage state, wherein the initializer comprises a unit for applying a second potential higher than the first potential to bring the two dual rail lines to the second potential during the initialization clock.

10. The data processing circuit according to claim 3, wherein the converter comprises:
    a unit for applying a second potential larger than the first potential; and
    a third switch connected between the unit for applying the second potential and the second dual rail bus and being controllable by an output signal of the write driver.

11. The data processing circuit according to claim 1, formed integrally on a semiconductor substrate.

12. The data processing circuit according to claim 1, wherein the single rail bus is a part of a multiple single rail bus, the number of single rail buses of which is smaller than a number of dual rail buses in a multiple dual rail bus.

13. The data processing circuit according to claim 1, wherein the dual rail bus is formed to connect components within a bit slice of a calculating unit to one another, and wherein the single rail bus is formed to connect the bit slices of the calculating unit to one another or to external components.

14. The data processing circuit according to claim 13, wherein the single rail bus is formed to transmit data for an initialization of bit slices or final result data from the bit slices.

15. The data processing circuit according to claim 13, wherein the number of bit slices in the calculating unit is larger than 1000, and
    wherein the number of single rail buses in a multiple single rail bus is smaller than or equal to 64.

16. The data processing circuit according to claim 1, wherein a physical length of the single rail bus is larger than a physical length of the dual rail bus.

17. The data processing circuit according to claim 1, further comprising a unit for encrypting or coding data on the single rail bus or for executing a precharge or pre-discharge operation on the single rail bus.

18. The data processing circuit according to claim 1, being formed in a chip card or a safety IC.

19. A method of transferring data from a single rail bus having a single rail line to a dual rail bus having two dual rail lines, wherein a first dual rail line is provided for a sequence of data bits and a second dual rail line is provided for a sequence of inverted data bits, comprising the steps of:

converting signals on the single rail bus into signals on the dual rail bus and vice versa, the step of converting comprising the steps of:

activating a read driver and transferring signals on the first dual rail line to the single rail bus and for ignoring signals on the second dual rail line when the read driver is activated; and activating a write driver and transferring the signals on the single rail bus to the first dual rail line when the write driver is activated, and generating the signals on the second dual rail line from the signals on the first dual rail line when the write driver is active, wherein the step of activating the read driver and the step of activating the write driver are executed so that at most either the read driver or the write driver is active.

* * * * *